Sept. 11, 1923. 1,467,307
G. A. CLEMENT ET AL
LENS BLOCKING MECHANISM
Filed May 20, 1921 3 Sheets-Sheet 1
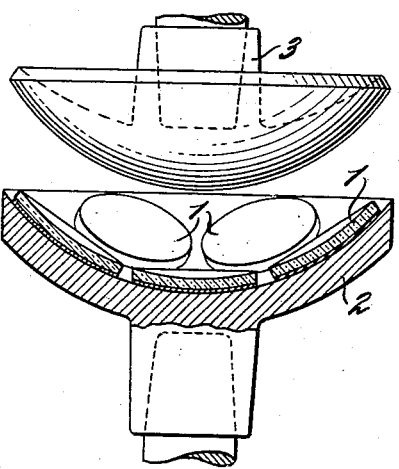
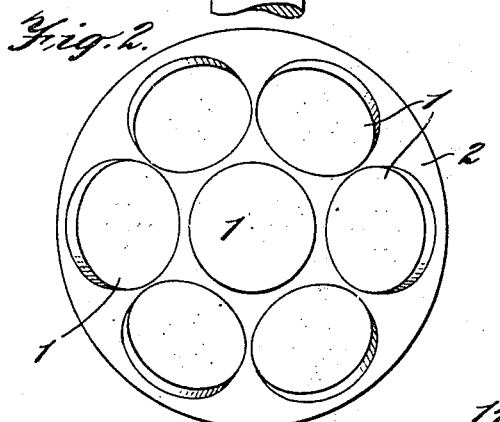
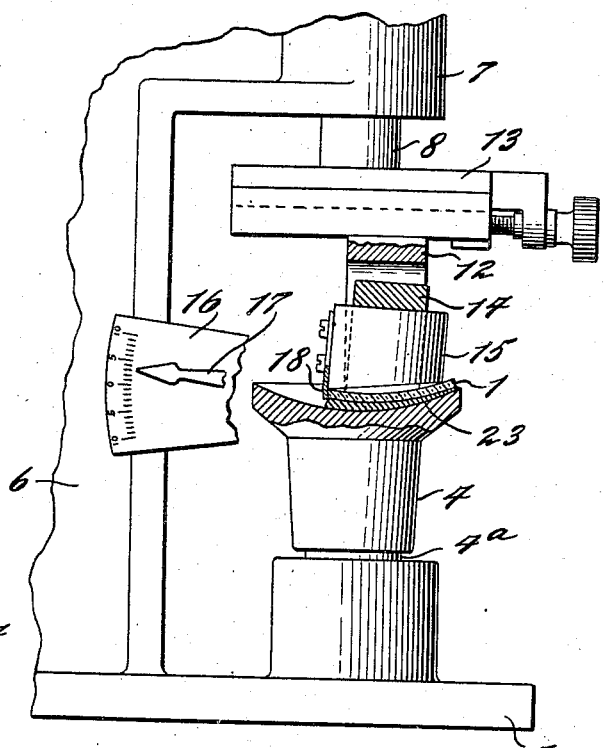
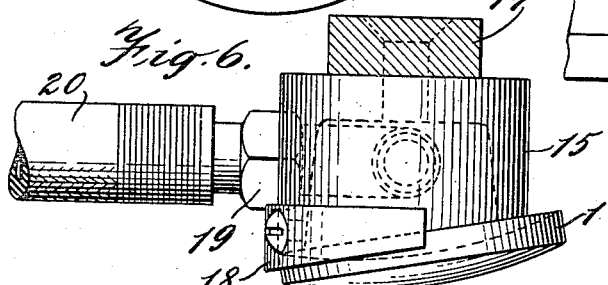
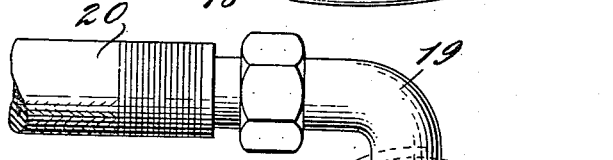

Sept. 11, 1923.
G. A. CLEMENT ET AL
1,467,307
LENS BLOCKING MECHANISM
Filed May 20, 1921
3 Sheets-Sheet 2
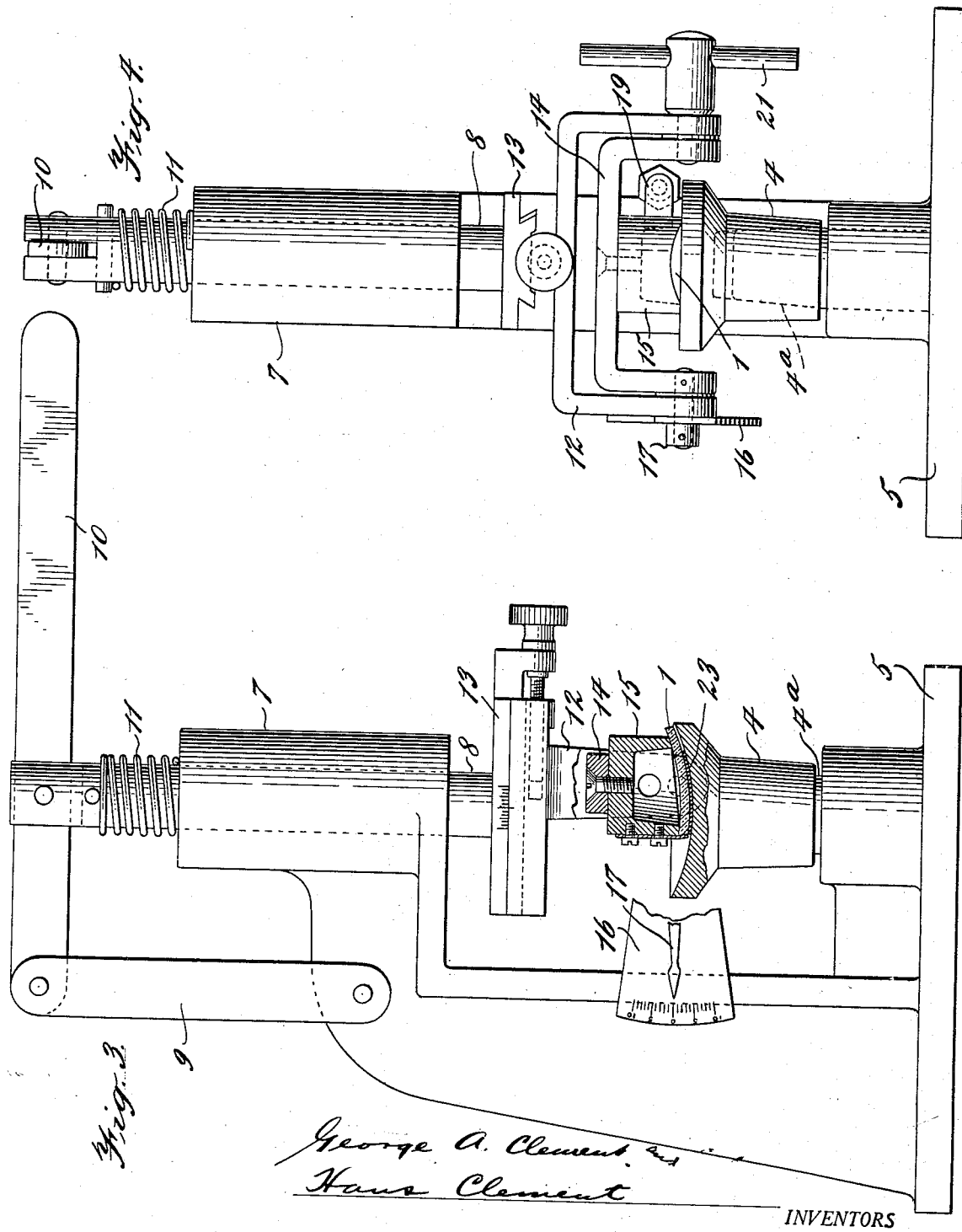

Sept. 11, 1923.
G. A. CLEMENT ET AL
1,467,307
LENS BLOCKING MECHANISM
Filed May 20, 1921    3 Sheets-Sheet 3
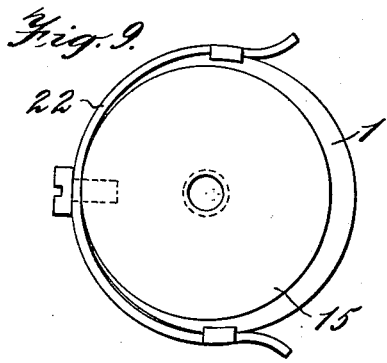
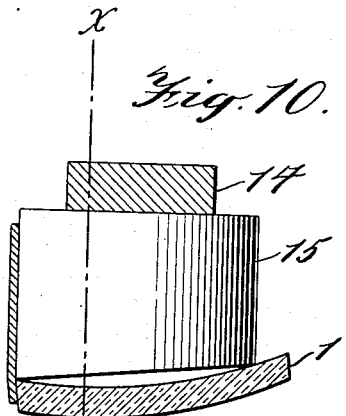
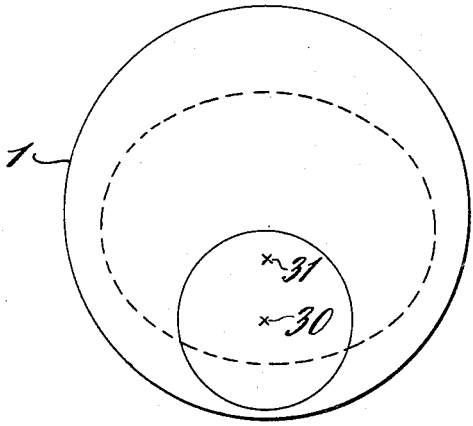
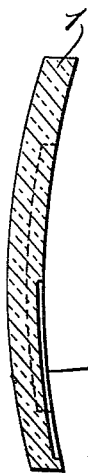
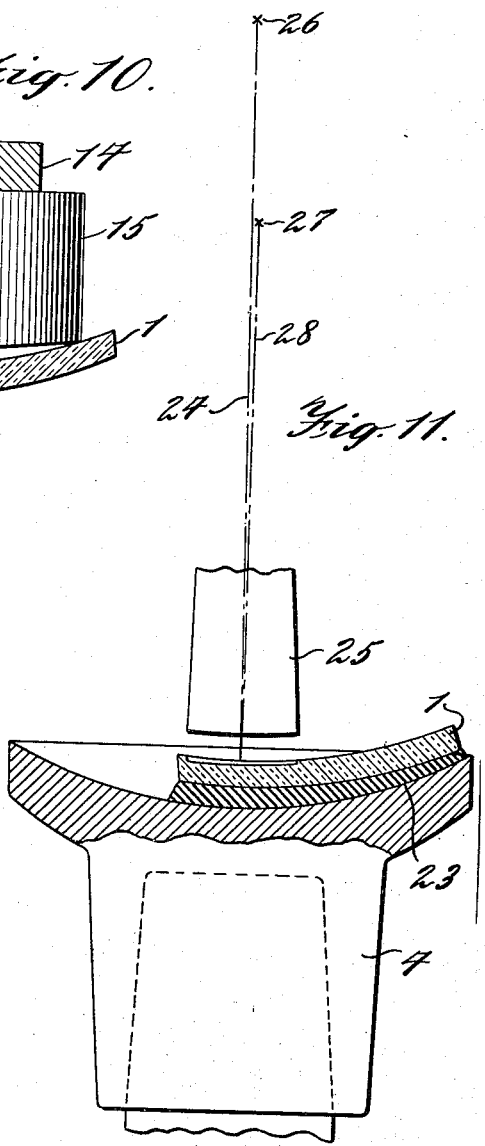
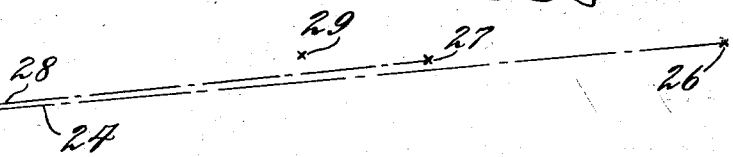

Patented Sept. 11, 1923.

1,467,307

UNITED STATES PATENT OFFICE.

GEORGE A. CLEMENT AND HANS CLEMENT, OF MOUNT VERNON, NEW YORK, ASSIGNORS TO GENERAL OPTICAL COMPANY, A CORPORATION OF NEW YORK.

LENS-BLOCKING MECHANISM.

Application filed May 20, 1921. Serial No. 471,059.

*To all whom it may concern:*

Be it known that we, GEORGE A. CLEMENT and HANS CLEMENT, citizens of the United States, residing at Mount Vernon, in the county of Westchester and State of New York, have invented certain new and useful Improvements in Lens-Blocking Mechanism, of which the following is a full, clear, and exact description.

Our invention relates to lens blocking apparatus and embodiments of our invention are particularly adapted for use in making one-piece bifocal lenses, that is, bifocal lenses consisting of a single homogeneous piece of glass having two different spherical curvatures on one side and a single continuous curvature on its other side, thereby forming a major or distant vision lens portion and a minor or vision lens portion.

The near vision or reading field of bifocal lenses is usually of circular outline and is more or less surrounded by the major or distance portion of the lens. This reading field may be elevated or it may be depressed with respect to the distance field portion, in either of which cases there is a shoulder at the junction of the two fields, or it may merge into the major field without a shoulder, there being only a line of demarcation between the two fields where the two spherical surfaces meet. In order that the two may merge without a shoulder, it is necessary that the radii of the two spheres passing through the geometrical center of the circular reading portion should coincide, and in such a case the surfaces are said to be concentric. If the two radii do not coincide then the surfaces are said to be eccentric, one being tilted with respect to the other and the two surfaces being joined by a shoulder of varying height.

It is desirable to have the optical axes of the two lens portions coincide as nearly as possible with the line of vision through the two fields as the lenses are used, in order to reduce prismatic aberration to a minimum. While the optical axis through the reading field is usually raised somewhat above the geometric center of the field in the finished lens by the disposition of the back surface on the lens, in some prescriptions the optical center is not raised enough to bring it into the line of vision. This is due to the fact that the segment or reading field must be at least of a certain minimum diameter, and the finished lens is usually cut out so as to include only half or a little more of the height of the segment. The optical center of the segment is therefore in certain prescriptions too near the bottom edge of the lens.

It has heretofore been proposed to tilt the segment so as to increase the prism base on one side or the other of the geometric center, and thereby decenter the lens portion toward that side, and our device may be employed in the making of such eccentric lenses in which the minor lens is decentered upward, although manifestly our blocking device may be employed in the making of any type of eccentric bifocal lenses as well as concentric bifocal lenses.

An object of our invention is to provide means for blocking up a rough or semi-finished blank accurately in any desired relationship to the axis of generation of the surface to be produced on the blank. For example in the production of one-piece bifocal lenses we contemplate grinding and polishing a plurality of glass blanks at one time to form the major lens portion of the bifocal surfaces, and then reblocking the blanks for treatment to produce the minor lens portion thereon individually. It is manifest that this reblocking must be done with extreme accuracy in order that the segment may have the desired relation to the major surface.

For this purpose our invention includes means for determining the radius line of the major surface which intersects the geometrical center of the area which is to constitute the segment and maintaining that line during the blocking up in any desired relation to the axis of the generation of the segment, which will usually be the axis of the block.

We will now describe the embodiment of our invention illustrated in the accompanying drawings and shall thereafter point out our invention in claims.

Fig. 1 is a detail in elevation of a block and grinding tool, illustrating the method of blocking and grinding a plurality of blanks at one time to form the major lens surfaces thereon;

Fig. 2 is a plan of the block with the plurality of blanks mounted thereon;

Fig. 3 is a detail in side elevation, with parts in section, of the blocking mechanism for reblocking the partially finished blanks preparatory to forming the minor lens surface;

Fig. 4 is a front elevation of the same;

Fig. 5 is a view similar to Figure 3 of a portion of the mechanism shown therein and with the lens blank tilted to an indicated degree preparatory to grinding the minor lens surface in a tilted or eccentric relation to the major surface;

Fig. 6 is a detail in side elevation of the annular gage and suction device for holding the blank;

Fig. 7 is a plan of the same;

Figs. 8 and 9 are corresponding views of the gage with a modified form of blank holding means;

Fig. 10 is a detail similar to Figure 6 with the blank in section and the determined radial line of the finished surface indicated;

Fig. 11 is a sectional detail of the blocked lens and the block after the minor surface is ground, indicating the manner of grinding that surface;

Fig. 12 is a face view of the blank with the bifocal surface finished: and

Fig. 13 is a section of the same.

The treatment of the rough blanks in multiple to reduce their inner or minus faces to the curvature desired for the major lens portion may be effected as indicated in Figures 1 and 2, a plurality of blanks 1, shown as eight in number, being pitched to a block 2 of sufficient size, and then surfaced with a tool 3 of the proper curvature in the well known way. When this operation is completed the blanks 1 are removed from the block 2 and pitched to a block 4 on a taper stud 4ᵃ in the proper relation to the axis of the block by means of the reblocking mechanism illustrated in Figures 3 to 9, and which will now be described.

The frame of the reblocking device has a base 5 from which rises a standard 6 terminating at its upper end in an overhanging bearing 7 for the vertically reciprocating spindle 8, which, with its auxiliary parts, constitutes a preliminary holder to hold the semi-finished blanks as they are being reblocked. This spindle is manipulated through links 9 and 10 and is normally held elevated by a coil spring 11. Carried by the lower end of the spindle 8 is what we term the stationary U-shaped member 12, although this member is bodily adjustable transversely of the axis of the spindle 8 through a slide mechanism 13 for a purpose which will be hereinafter described. Pivoted internally to the U-shape member 12 on a horizontal axis is what we term the pivoted U-shape member 14 which has secured to its under side the blocking ring or gage 15. The stationary U-shape member carries an index plate 16 provided with a suitable scale, co-operative with which is a pointer or indicator 17 carried by one of the pivots of the U-shape member 14. The glass blank 1 is secured to the bottom face of the annular gage 15 against a stop 18 by means of suction, in the form shown. The hollow interior of the gage 15 is connected through a coupling 19 to an air hose 20 leading to a suitable exhausting device. By this means the pressure within the gage 15 is reduced sufficiently to hold the blank 1 firmly in place, as shown in the drawings.

The spindle 8 is disposed in axial alignment with the block 4, and by operating the slide 13 the blank 1 can be adjusted so that when it is secured to the block 4 the segment or minor surface will come just the desired distance from the edge of the blank, when the block 4 is transferred to the grinding machine for forming the segment in the finished surface of the blank. The adjustment of the slide 13 will therefore depend both upon the size of the segment and its distance from the edge of the blank. In every case the adjustment will be such that the radius of the finished surface on the blank 1 which intersects the geometrical center of the area which is to constitute the segment, coincides with the axis of the block 4 and spindle 8 when the indicator 17 is at zero. This radius line is indicated in Fig. 10 by $x$—$x$ and it is evident that the relation of this radius line to the axial line of the spindle 8 and block 4 depends not only on the position of the slide 13 but also on the angular disposition of the gage 15 on its pivots. As a matter of fact the point of intersection of the axial line of the spindle and block with the upper surface of the blank will always be the geometrical center of the segment, and the position of this center with respect to the blank varies with the size of the segment and its distance from the edge of the blank. The slide will, therefore, be set according to the size and location of the segment, and the gage will then be set so that with the line $x$—$x$ coinciding with the axial line, the pointer 17 is at zero. It will be understood that the angular disposition of the gage to effect this result will depend both on the radius of curvature of the lens surface and on the angle of inclination of the lower face of the gage. For instance if it be desired to increase the diameter of the segment, then the slide 13 must be moved one-half the difference between the two diameters in order to maintain the distance of the segment from the edge of the blank. In doing this the angle of inclination of the lower face of the gage 15 will necessarily change, since manifestly this angle becomes greater as the gage is moved to the right as viewed in Figure 5. Also the inclination will be greater for a lens of shorter than for a lens of longer radius. For every condition, therefore, the yoke or U-shaped member 14 must be set relative to the pointer 17 so that the line x—x coincides with the axial line when the pointer is at zero.

Practically the device will be operated continuously for a period upon lens blanks all finished on the minus side to a given base curve, and intended for finishing into bifocal surfaces with the segment of a constant diameter, and location relative to the edge of the blanks. The yoke 14 will then be set to meet this condition so that with the given base curve, the angle of the bottom face of the gage 15, and the adjustment of the slide 13 to effect the proper disposition of the segment of the prospective size from the edge of the blank, the line x—x will coincide with the axial line when the pointer 17 is at zero.

This radial line x—x is therefore the one from which the degree of tilt of the blank is measured if the segment is to be prismatic, that is, if it is to be ground eccentrically. The angular adjustment of the gage 15 upon its pivots is effected by means of a hand wheel 21 or the like.

In lieu of the vacuum type of blocking ring, the blocking ring may be provided with a spring clip 22, as shown in Figs. 8 and 9, and for most purposes it will be found that this alternative construction for holding the blank will be satisfactory.

Ordinarily the hand wheel 21 will be so initially adjusted that the radius line x—x coincides with the axis of the block 4 and spindle 8; in other words so that the pointer 17 is at zero. While lever 10 and spindle 8 are in elevated position the blank 1 is applied to the under side of the gage or blocking ring 15, and a layer of hot pitch 23 applied to the upper surface of the block 4. If it is desired to grind the segment concentrically with respect to the major surface, the pointer 17 is left at zero and the lever 10 is depressed and the blank is pressed into the pitch 23 and held there until the pitch sufficiently hardens to hold the blank. Then the blank is released from the blocking ring, and the spindle and the parts carried thereby are allowed to rise.

If, on the other hand, it is desired to tilt the blank so as to grind the segment eccentrically, the hand wheel 21 is rotated until the pointer 17 indicates the desired degree of tilting, as is indicated in Fig. 5, for instance, and the spindle 8 is depressed with the blank in that tilted position, and the blank is thus secured to the block. In Fig. 11 we have indicated diagrammatically the subsequent grinding operation to form the segment, and the blank is shown as tilted in this figure to increase the prism base of the segment upward, or in other words to decenter the reading lens upward. The line 24 is the axial line of the block 4 and the grinding tool 25, and since the grinding of the segment is effected by the relative rotation of the tool and blank upon this axis, line 24 is the axis of generation of the segment. The center of generation of the segment is the point 26, while the center of generation of the major surface is the point 27. The line 28, therefore, corresponds to the line x—x in Fig. 10.

In Fig. 12 is shown the bifocal face of the blank after the segment has been ground. The back or convex face of the blank is then ground according to prescription, and the finished lens is cut out as indicated by the dotted line. In the sectional view of this blank shown in Fig. 13, in which the finished lens is indicated by dotted lines, it is assumed that the center of the back face is the point 29. As is well understood the optical axis of the major lens portion is along the line including the points 27 and 29, while the optical axis of the minor lens portion is along the line including the points 26 and 29. The tilting of the lens, therefore, serves to raise the optical center of the segment.

If the lens were not tilted and the spherical center 26 of the segment were on line 28, with a plano lens and disregarding the thickness of the lens, the optical center of the segment would be said to coincide with its geometrical center 30. By the tilting of the lens it will be observed that the optical center is raised to substantially the point 31.

It is obvious that various modifications may be made in the construction shown and above particularly described within the principle and scope of our invention.

We claim:

1. A lens blocking device comprising a block holder, a lens holder and a support therefor, one of the holders being reciprocable toward and from the other and the lens holder being adjustable relative to the direction of said movement.

2. A lens blocking device comprising a block holder and a lens holder, one of the holders being reciprocable toward and from the other and one of the holders being tiltable to vary the relation of the axes of the two holders.

3. A lens blocking device comprising a block holder and a spindle, one of which is reciprocable toward and from the other, and lens holding means on the lower end of the spindle for carrying a lens blank in definite relation to the axis of the block holder, said lens holding means being adjustable relative to the axis of the block holder.

4. A lens blocking device comprising a block holder and a spindle, one of which is reciprocable toward and from the other, and lens holding means on the lower end of the spindle for carrying a lens blank in definite relation to the axis of the block holder, said lens holding means being angularly adjustable on an axis normal to that of the block holder.

5. A lens blocking device comprising a block holder and a spindle mounted in axial alignment and one being relatively reciprocable toward and from the other, and a lens holder pivoted to the lower end of the spindle on a transverse axis.

6. A lens blocking device comprising a block holder and a spindle mounted in axial alignment and one being relatively reciprocable toward and from the other, and a lens holder carried by the lower end of the spindle and bodily adjustable transversely of the axis of the spindle.

7. A lens blocking device comprising a block holder and a spindle mounted in axial alignment and one being relatively reciprocable toward and from the other, and a lens holder pivoted to the lower end of the spindle on a transverse axis, and bodily adjustable transversely of the axis of the spindle.

8. A lens blocking device comprising a block holder and a spindle mounted in axial alignment and one being relatively reciprocable toward and from the other, an annulus on the lower end of the spindle, and means for securing a lens blank against the annulus.

9. A lens blocking device comprising a block holder and a spindle mounted in axial alignment and one being relatively reciprocable toward and from the other, an annulus on the lower end of the spindle and adjustable relative to the axis of the spindle, and means for securing a lens blank against the annulus.

10. A lens blocking device comprising a block holder, an axially reciprocable spindle opposing the block holder, a transversely slidable supporting member on the lower end of the spindle, a blocking ring carried by the supporting member, and means for securing a glass blank to the under face of the blocking ring.

11. A lens blocking device comprising a block holder, an axially reciprocable spindle opposing the block holder, a transversely slidable supporting member on the lower end of the spindle, a blocking ring carried by the supporting member and pivoted thereto on a transverse axis, and means for securing a glass blank to the under face of the blocking ring.

12. A lens blocking device comprising a block holder, an axially reciprocable spindle opposing the block holder in axial alignment therewith, an inverted U-shape member attached to the end of the spindle and slidable thereon transversely of the axis thereof, a second inverted U-shape member pivoted internally of the first U-shape member on a transverse axis, and a blocking ring carried by the second U-shape member.

In witness whereof we hereunto subscribe our signatures.

GEORGE A. CLEMENT.
HANS CLEMENT.